Aug. 26, 1924.

O. G. WELLTON

BEET HARVESTER

Filed April 8, 1922

1,506,398

5 Sheets-Sheet 1

Inventor:
OTTO GOTTFRIED WELLTON
By George Bayard Jones
Atty

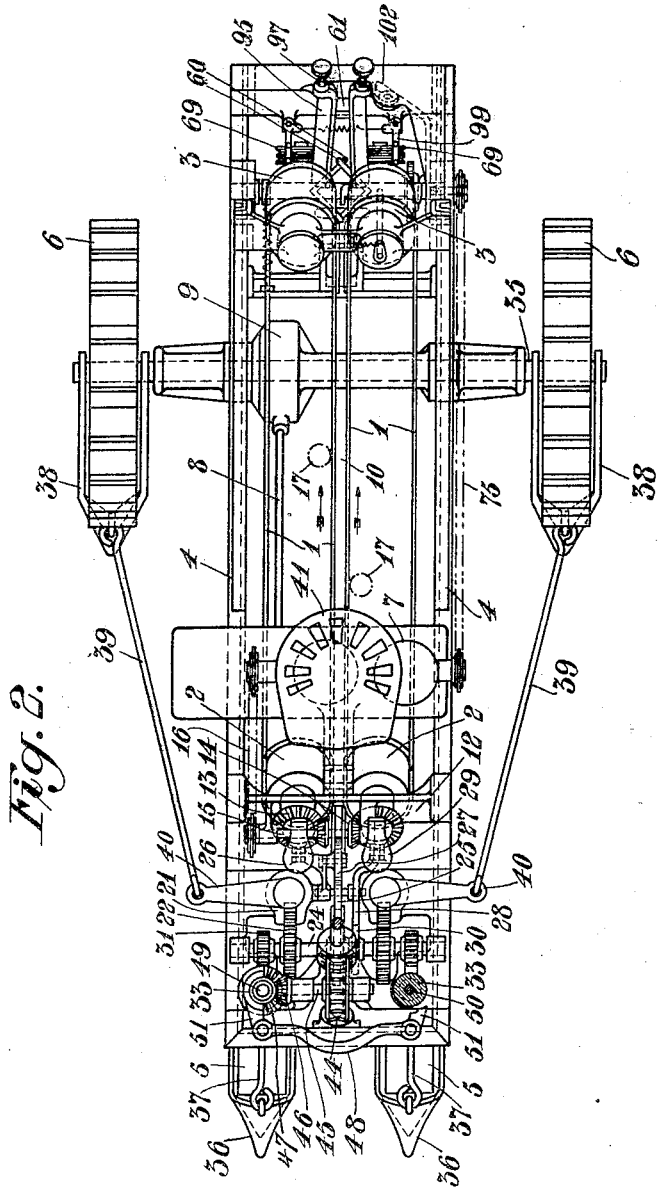

Aug. 26, 1924.  
O. G. WELLTON  
BEET HARVESTER  
Filed April 8, 1922

1,506,398

5 Sheets-Sheet 3

Inventor:
OTTO GOTTFRIED WELLTON

By George Bayard Jones
Atty.

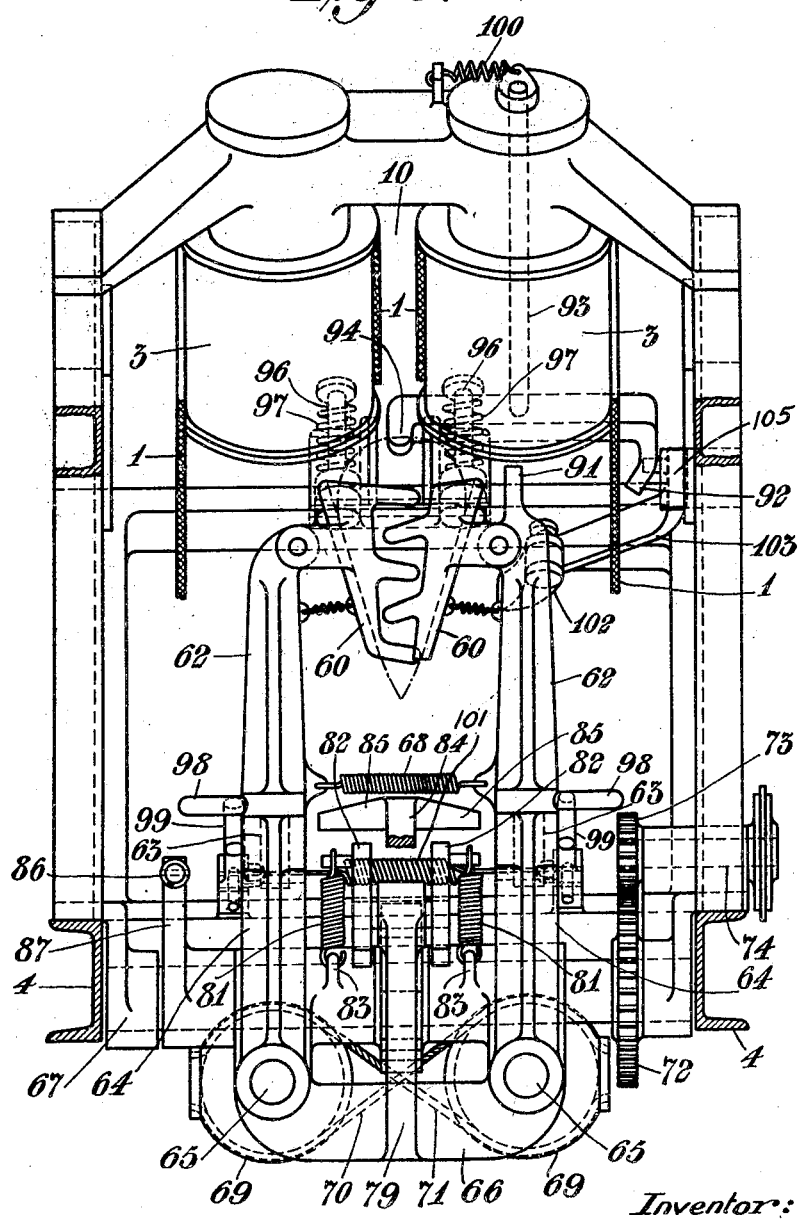

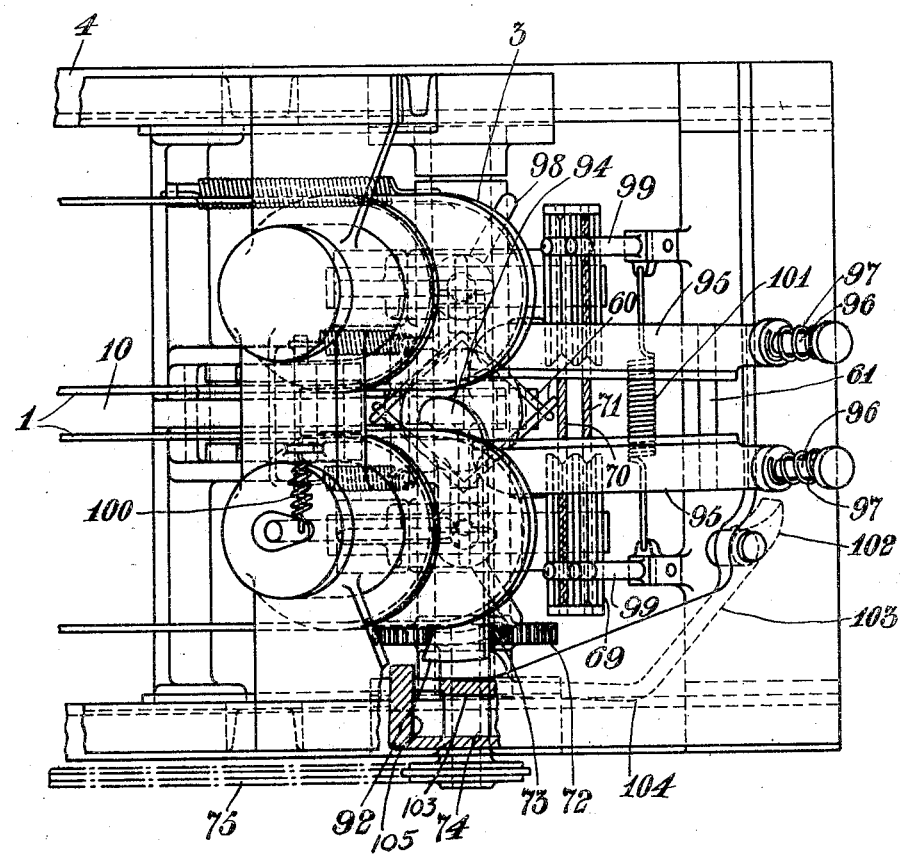

Patented Aug. 26, 1924.

1,506,398

UNITED STATES PATENT OFFICE.

OTTO GOTTFRIED WELLTON, OF MALMO, SWEDEN.

BEET HARVESTER.

Application filed April 8, 1922. Serial No. 550,599.

*To all whom it may concern:*

Be it known that I, OTTO GOTTFRIED WELLTON, a subject of the King of Sweden, residing at Malmo, Sweden, have invented a new and useful Improvement in Beet Harvesters, of which the following is a specification.

The present invention relates to a beet harvester for gathering and nipping beets and similar roots, of the kind provided with members operating in the soil for loosening the beets, and with members adapted to grip the tops of the beets and pull the beets out of the soil and feed the beets to a nipping device for cutting off the tops. Beet harvesters of this kind as heretofore used have the disadvantage that most frequently they do not cut the tops in the proper place but either too high or too low. In the former case a portion of the top will remain on the beet, so that for instance in the case of beetroots, the sugar-works will reject the beetroots, and in the latter case a greater or less portion of the beets goes to waste which of course entails a financial loss to the grower. Heretofore used harvesters are also complicated and expensive.

The object of the present invention is to avoid the said disadvantages, and for this purpose the invention is broadly characterized by this that the nipping device consists of gripping members provided on two arms capable of swinging forwards and back, said gripping members being also capable of moving towards and away from one another in such manner that when swinging in the one direction they are located at a comparatively large distance from one another and can move past a beet, whereas when swinging in the other direction said members are moved towards one another so that they grip the beet and carry the beet towards a knife for nipping the top of the beet. The gripping members, which may be provided with fingers for enclosing or gripping around the beets, diverge suitably outwards from the center of rotation, and outside the path of movement of the gripping members there are suitably provided arcuate or curved guide rails, against which the beets are moved during the swinging motion of the gripping members, and which guide rails guide the beets during the nipping. In this manner the beets are correctly gripped and guided so that the tops of the beets will be nipped or cut off at the proper place.

Figures 1, 5:
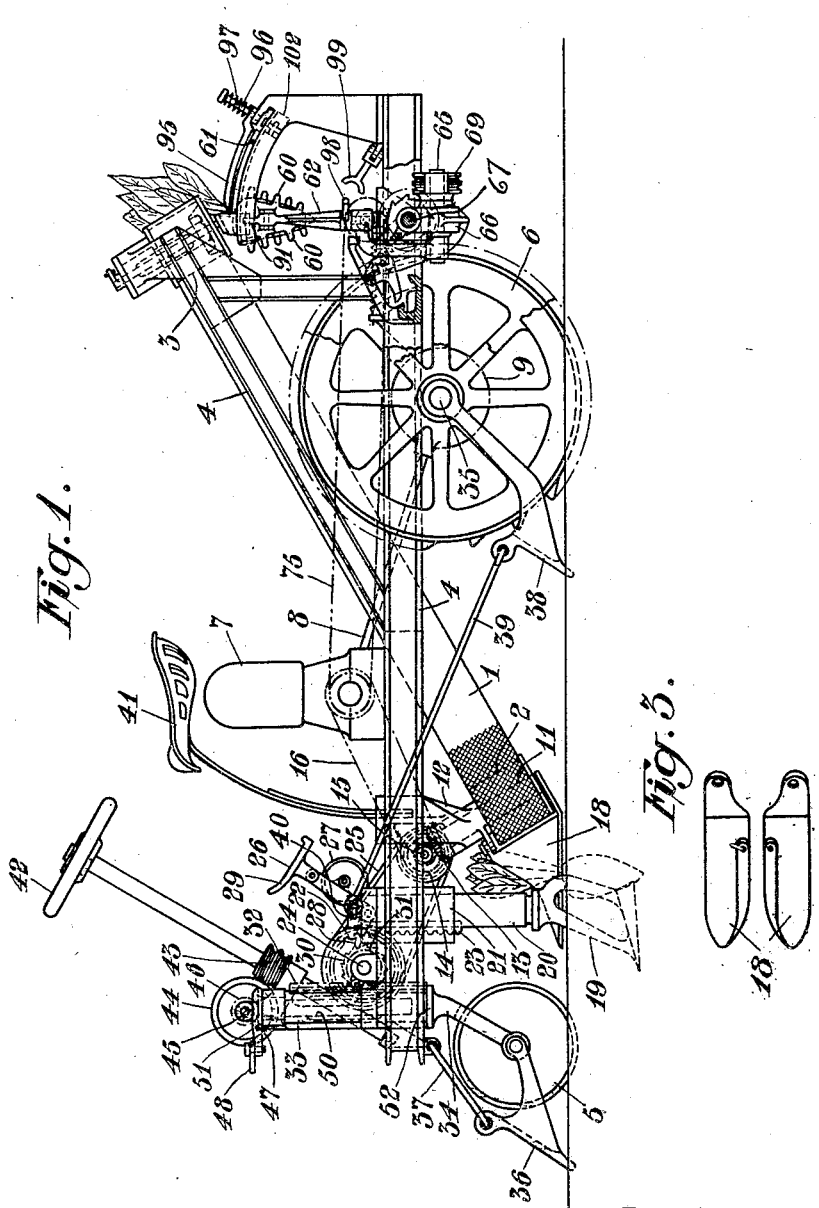
Figure 4:
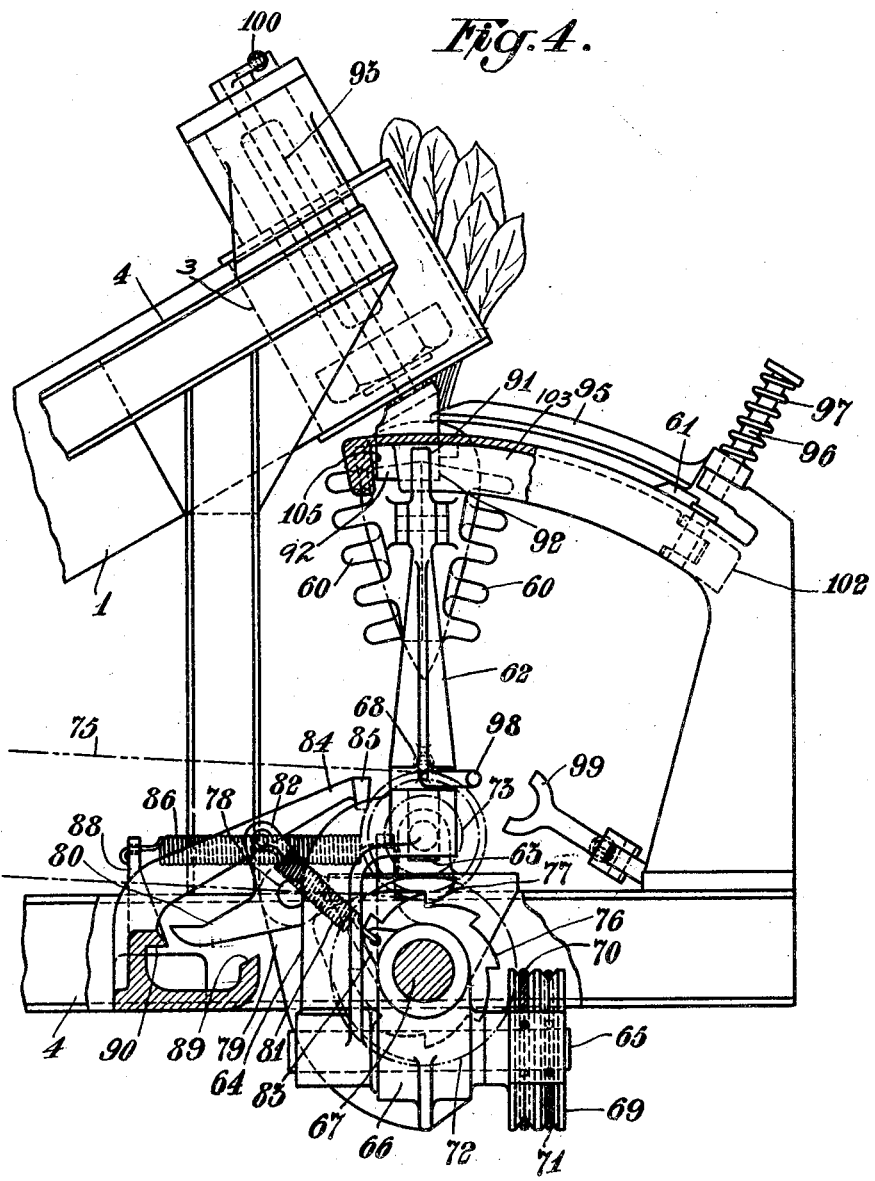

In the accompanying drawings an embodiment of the invention is shown by way of example. Fig. 1 shows a side view of a beet harvester according to the invention, and Fig. 2 shows a plan view of the harvester. Fig. 3 shows a plan view of the top-guides. Figs. 4–6 show to a larger scale the device for nipping the beets, in Fig. 4 viewed from the side, in Fig. 5 from the front end of the harvester, and in Fig. 6 from above.

In the embodiment illustrated the members for pulling the beets out of the soil consist of two endless bands 1 of rubber or similar material which run over front and rear rollers, 2 and 3 respectively, which rollers are journalled in the machine frame 4. Said frame is carried by two front guide wheels 5 and two larger rear driving wheels 6, which are driven by the engine 7 mounted on the frame, through suitable gearing, for instance a Cardan shaft 8 and differential gear 9. The bands 1 are located adjacent and parallel to one another in such manner that their inner parts form together a chute 10 for the tops of the beets, and in an inclined position, as shown in Fig. 1, in such manner that the front ends of the bands, in the direction of movement of the machine, are located near to the ground, whereas the two rear ends are located at a considerable distance above the ground. The front rollers 2 are secured to their shafts 11 which are journalled in an inclined position in arms 12 rigidly connected with the frame 4, said shafts supporting at their upper ends bevel gear-wheels 13 meshing with two bevel pinions 14, which are secured to a common horizontal shaft 15 driven from the engine 7 by means of a chain 16. The rear rollers 3 are driven by the bands 1. The inner parts of the bands 1 are maintained at the desired distance from one another by a number of supporting rollers 17 journalled in suitable manner in the frame.

To the arms 12, which support the front rollers 2, there are secured two plow-like top-guides 18, Figs. 1 and 3, which serve to gather the tops and convey the same into the chute 10 between the inner parts of the bands 1. The lower portions of said top-guides are formed as sleighs sliding on the soil, the top-guides thus preventing the rollers 2 and the front ends of the bands from touching the ground. Two plow-members 19 are provided, one on each side of and slightly in front of the top-guides 18, said plow-members reaching down into the soil on each side of the row of beets and serving to loosen the beets. The plow-members are secured to spindles 20 slidable in vertical direction in bushings 21 in the machine frame and capable of being raised and lowered by means of toothed wheels 22 meshing with toothed racks 23 secured to said spindles. The toothed wheels 22 are secured to a common shaft 24 journalled in the machine frame, which shaft may be driven from the shaft 15 by means of a belt 25. Said belt is of such length that normally it slides on its pulleys secured to the shafts 15 and 24, so that the shaft 24 is not rotated during the rotation of the shaft 15, but the belt may be tightened by forcing down a pedal 26 acting by means of a roller 27 on the belt so that the shaft 24 is caused to rotate. In this manner the plow-members 19 may thus be raised out of the soil when the harvester has arrived at the end of the row of beets. When the plow-members have been raised in this manner a pawl 28, which is actuated by a spring not shown in the drawing, engages a ratchet wheel 30 secured to the shaft 24. In this manner both plow-members 19 are thus retained in raised position, when the harvester is to be turned around or transported on a road.

There are also secured to the shaft 24 two toothed wheels 31 meshing with two toothed racks 32 movable in vertical direction and adapted during such movement to carry along two spindles 33 movable in vertical direction in the frame, the lower ends of said spindles being formed as forks 34 in which the guide wheels 5 are journalled. When in the manner above described the shaft 24 is caused to rotate by the belt 25 being tightened for the purpose of raising the plow-members 19, the spindles 33 will be moved downwards in relation to the machine frame, with the result that the front portion of the frame is turned upwards around the shaft 35 of the driving wheels 6. Owing to this movement the top-guides 18 and the rollers 2 are raised from the ground, so that they do not strike rises in the ground during the transport of the machine. Snow-plow-like shields 36 are pivoted to the shafts of the guide wheels 5, said shields preceding the wheels and serving to move the tops of the beets aside, so that they do not become pressed down by the wheels. Said shields are connected with the frame by means of links 37, so that the shields are lifted when the front portion of the frame is turned upwards, as above described. In similar manner there are provided shields 38 in front of the driving wheels 6, said shields being pivoted to the shaft 35 and connected by means of links 39 with arms 40 projecting laterally from the upper ends of the spindles 20, so that said shields will be turned upwards when the spindles 20 are moved upwards for the purpose of raising the plow-members 19. On rotation of the shaft 24 in counter-clockwise direction in Fig. 1 the parts 36, 19, 18, 2, and 38 will thus be simultaneously raised from the ground, so that the machine may freely be turned and transported.

The machine is guided by means of a hand wheel 42 located in front of the driver's seat 41, the movement of said hand wheel being transmitted by means of a worm gearing 43, 44 to a horizontal shaft 45 on which a bevel gear-wheel 46 is secured. Said gear-wheel meshes with a bevel gear segment 47 which is secured to a vertical shaft 49 journalled in the machine frame, the lower square portion of said shaft engaging a longitudinal aperture of corresponding shape in the spindle 33 of one of the guide wheels 5. In this manner the spindle may be turned as well as displaced longitudinally. The spindle of the other guide wheel, in which spindle there is also provided a slidable square shaft 50, is turned by means of a link 48, which connects two levers 51 secured one on each of the shafts 49 and 50. In order to render possible the rotary movement as well as the vertical movement of the spindles 33 there is provided around each spindle a flange 52 against which the lower end of the toothed rack 32 abuts.

The parts of the machine are returned to working positions, shown in Fig. 1, by the pedal 29 being depressed which causes the pawl 28 to be moved out of engagement with the ratchet wheel 30. Owing to the weight of the frame the shaft 24 is caused to rotate in clock-wise direction in Fig. 1, so that the plow-members 19 are forced down into the ground. If desired, this movement may be braked by a slight depression of the pedal 26.

When the machine is driven forward over a row of beets the two guide wheels 5 run on the two sides of the row, the driving wheels 6 embracing three rows of beets. The beets are loosened by the plow-members 19, and simultaneously the top-guides 18 gather the tops of the beets and guide said tops into the chute 10 between the inner parts of the bands 1, between which the tops are so much compressed that during their movement in the direction indicated by the arrows in Fig. 2 the bands are able to pull the loosened beets out of the soil. For this purpose the bands are provided on their outer sides with ridges or ribs in a check pattern, so that the bands are capable of securely gripping the tops, even if the thickness of the tops of the different beets varies.

The speed with which the bands move, is adjusted in relation to the speed of the machine in such manner that every point of the inner parts of the bands will move in a vertical direction upwards, so that thus the bands exert a pulling action on the beets in a direction straight upwards. This of course facilitates the pulling up of the beets.

When the beets have been pulled up in the manner described, the beets are transported, hanging in vertical position between the bands 1, up to the device for cutting off or nipping the tops. This device, which is mounted on the rear portion of the frame 4, consists of two gripping members 60, which grip around the beets proper immediately before the bands 1 let go their hold of the tops, and carry the beets towards a knife 61 which cuts off the tops. The gripping members 60 consist of angularly bent plates provided with fingers, said plates being located opposite one another immediately below the rear ends of the bands 1 and being pivotally and yieldingly connected with two arms 62. The lower ends of said arms are shaped as pivots 63 and are rotatably journalled in two other arms 64, which are secured to two parallel shafts 65, which in their turn are rotatably journalled in a common frame 66, which is rotatable on a shaft 67 in the machine frame. The pivots 63 are perpendicular to the shafts 65, which in their turn form right angles to the shaft 67, so that the gripping members 60 may obtain a threefold movement, namely a rotary movement on the pivots 63, a swinging movement towards and away from each other upon the shafts 65, and a swinging movement in unison on the shaft 67. A coil spring 68 is secured between said two arms 62 and tends to move said arms and thus also the gripping members 60 towards each other and towards the beet between said gripping members, said spring also tending to maintain the gripping members directed towards one another. The shafts 65 carry rope pulleys 69 with double tracks in which two ropes 70 and 71 are placed, the ends of said ropes being secured to the pulleys, and the ropes crossing each other between the pulleys, so that when one of the pulleys 69 is turned in the one direction—for instance counter-clockwise in Fig. 5—the other pulley is forced to turn through an equal angle in the opposite direction—clockwise in Fig. 5. In this manner the arms 64 and 62 with the gripping members 60 are forced always to swing symmetrically in relation to a vertical plane midway between and parallel with the shafts 65.

To the shaft 67 a toothed gear wheel 72 is secured which meshes with a toothed gear wheel 73 on a short intermediate shaft 74, which is driven from the engine 7 by means of a chain drive 75, so that the shaft 67 always rotates in a clockwise direction as viewed in Fig. 4. In the middle of the shaft 67 there are also secured a ratchet wheel 76 which may be engaged by a pawl 77 turning on a pivot 78 secured to an arm 79 projecting upwards from the lower portion of the frame 66. The pawl 77 is provided with a fork-like extension 80 which projects on the opposite side of the pivot 78, and said pawl is actuated by two springs 81 located one on each side of the same, the upper ends of said springs being secured to upwardly projecting portions 82 of the pawl, and their lower ends being secured to lugs 83 on the upper side of the frame 66. Said springs 81 are located in such manner relatively to the pivot 78 of the pawl that in the position of the pawl shown in Fig. 4 said springs tend to maintain the pawl in engagement with the ratchet wheel 76, whereas when the pawl has been turned in counter-clockwise direction in Fig. 4 so far that the direction of pull of the springs passes the pivot 78, said springs tend to turn the pawl in a direction out of engagement with the ratchet wheel. When the pawl is in engagement with the ratchet wheel the frame 66 and the arms 64 and 62 and the gripping members 60 are carried along in the rotation of the shaft 67 in the clockwise direction in Fig. 4 in order to move the beet against the knife 61.

The turning of the pawl 77 out of engagement with the ratchet wheel 76 is effected by a T-shaped arm 84, which is secured to the machine frame, and against the laterally projecting portions 85 of which the projections 82 of the pawl 77 strike during the turning above described of the frame 66 in the clockwise direction in Fig. 4, so that the springs 81 are moved past the pivot 78 and thus maintain the pawl out of engagement. During the said turning of the frame 66 a spring 86 is stretched, which spring is inserted between an arm 87 projecting from the frame 66, and a fixed part 88 of the machine frame. When in the manner above described the pawl 77 has been moved out of engagement with the ratchet wheel 76, the spring 86 will obviously turn back the frame 66 and the parts 64, 62 and 60 in counter-clockwise direction in Fig. 4. During such movement the forked extension 80 of the pawl first strikes against a fixed stop 89, so that the pawl is turned somewhat in the clockwise direction around the pivot 78, so that the springs 81 tend to turn the pawl into engagement with the ratchet wheel. This turning, however, is at first prevented by the extension 80 reaching in under a second fixed stop 90. The arms 62 with the gripping members 60 are then in a position slightly to the left of that illustrated in Fig. 4, the gripping members being held separated from each other by a finger 91 projecting from the upper end of the right-hand arm 62 in Fig. 5, which finger bears against a bent arm 92, which is secured to a shaft 93 rotatable in the shaft of the right-hand roller 3. The gripping members are now ready to receive a beet from the bands 1.

When a beet has been moved by the bands 1 so far upwards that the top of the beet strikes against one end 94 of the arm 92 projecting into the chute 10, said arm is turned in such manner that the finger 91 loses its support on the arm, with the result that the spring 68 pulls the arms 62 with the gripping members 60 towards one another so that the gripping members are closed around the beet. The beet is actuated during still a short time, however, by the bands 1 which pull the beet obliquely upwards to the right in Fig. 4, so that the beet slides somewhat upwards between the gripping members, with the result that earth is scraped from the beet. The beet is pulled upwards in this manner until the beet neck strikes against two parallel curved guide rails 95, which are secured to the machine frame by means of studs 96 and strong springs 97 on said studs, so that the rails may be capable of a slight movement in the vertical direction. Simultaneously, the beet is pulled by the bands 1 slightly to the right in Fig. 4, however, with the result that the gripping members 60 and the parts 62, 64 and 66 are slightly turned in clockwise direction, so that the extension 80 on the pawl loses its hold against the stop 90, so that the springs 81 turn the pawl 77 into engagement with the ratchet wheel 76. Simultaneously the bands 1 let go their hold on the top of the beet. The parts 66, 64, 62 and 60 will now be carried along in the rotation of the shaft 67, so that the beet, while sliding with its neck against the rails 95, will be moved with great speed against the knife 61 secured to the rails, which knife will thus cut off the top at the proper place. Meanwhile the arm 92, actuated by the spring 100, resumes its initial position with its end 94 projecting into the chute 10.

Immediately after the beet has been nipped in the manner described two outwardly projecting studs 98 secured to the arms 62 strike against two forks 99, which are pivotally mounted on the machine frame and are normally maintained in the position shown in Fig. 6 in the paths of travel of the studs 98, by a spring 101 inserted between said forks which are capable of swinging out from one another, however, under the action of said studs 98. By said studs 98 striking against said forks 99 the arms 62 are turned on their pivots 63, so that the gripping members 60 are opened and throw out the nipped beet. The beets and the beet tops may be collected in separate boxes provided on the frame 4.

In the path of the finger 91 on the one arm 62 there is provided a tongue 102 turning on a fixed pivot, said tongue being turned aside by said finger 91 approximately simultaneously with the studs 98 striking against the forks 99. Immediately after the finger 91 has passed said tongue 102, which is spring-actuated so that it returns automatically to its shown initial position, the projections 82 on the pawl 77 strike against the portions 85 of the T-shaped arm 84, so that said pawl 77 is moved, in the manner above described, out of engagement with the ratchet wheel 76, so that the spring 86 begins to turn back the arms 62 with the gripping members to the left in Fig. 4. During this return movement, however, the finger 91 will strike against the outer side of the tongue 102, and said tongue being unable to yield in this direction, the finger 91 is caused to slide along the outer face of said tongue and along a fixed guide rail 103 which forms a continuation of the tongue. Said guide rail at first running away from the central plane of the machine, the arms 62 with the gripping members will be turned away from one another, while overcoming the resistance of the spring 68. When the finger 91 has passed the outermost point 104, Fig. 6, of the guide rail, the gripping members 60 again begin to approach each other while continuing to turn to the left in Fig. 4 on the shaft 67, until finally the finger 91 strikes against a fixed stop 105 in front of the forward end of the guide rail 103. The arms 62 with the gripping members are now pulled inwards towards one another by the spring 68, until the finger 91 strikes against the arm 92. The gripping members are now in position for receiving another beet from the bands 1, after which the course described repeats itself.

I claim:

1. In a beet harvester, the combination of members operating in the soil for loosening the beets, means adapted to grip the tops of the beets and pull the beets out of the soil and feed the beets to a nipping device, and a nipping device comprising a knife, two arms capable of swinging towards and away from said knife, and gripping members on said arms, said gripping members being adapted to move towards and away from one another in such manner that when said arms swing away from said knife said members are at a comparatively large distance from one another and can move past a beet, and that when said arms swing towards said knife said gripping members are moved towards one another so as to grip a beet and move the same towards said knife.

2. In a beet harvester, the combination of members operating in the soil for loosening the beets, means adapted to grip the tops of the beets and pull the beets out of the soil and feed the beets to a nipping device, and a nipping device comprising a knife, two arms capable of swinging towards and away from said knife, gripping members on said arms, said gripping members being movable towards and away from one another, and means for guiding said gripping members in such manner that when said arms swing away from said knife said members are separated at such distance from one another that they can move past a beet, and that when said arms swing towards said knife said gripping members are moved towards one another so as to grip a beet and move the same towards said knife.

3. In a beet harvester, the combination of members operating in the soil for loosening the beets, means adapted to grip the tops of the beets and pull the beets out of the soil and feed the beets to a nipping device, a nipping device comprising a knife, two arms capable of swinging towards and away from said knife, gripping members on said arms, said gripping members diverging outwards from the axis of rotation of said arms and being movable towards and away from one another, and means for guiding said gripping members in such manner that when said arms swing away from said knife said members are separated at such distance from one another that they can move past a beet, and that when said arms swing towards said knife said gripping members are moved towards one another so as to grip a beet and move the same towards said knife, and curved guide rails located outside the path of movement of said gripping members and adapted to guide the beet held by said gripping members during the swinging movement of said members towards said knife.

4. In a beet harvester, the combination of members operating in the soil for loosening the beets, means adapted to grip the tops of the beets and pull the beets out of the soil and feed the beets to a nipping device, a nipping device comprising a knife, two arms capable of swinging towards and away from said knife and capable of turning towards and away from one another, gripping members secured to said arms in such manner as to be capable of turning around axes located substantially in the longitudinal directions of said arms and substantially perpendicular thereto, and means for guiding said gripping members in such manner that when said arms swing away from said knife said members are separated at such distance from one another that they can move past a beet, and that when said arms swing towards said knife said gripping members are moved towards one another so as to grip a beet and move the same towards said knife, and curved guide rails located outside the path of movement of said gripping members and adapted to guide the beet held by said gripping members during the swinging movement of said members towards said knife.

5. In a beet harvester, the combination of members operating in the soil for loosening the beets, means adapted to grip the tops of the beets and pull the beets out of the soil and feed the beets to a nipping device, a nipping device comprising a knife, a frame journalled so as to swing in directions towards and away from said knife, two parallel shafts journalled in said frame transversely to the axis of rotation of the same, two arms secured to said shafts so as to be capable of swinging towards and away from one another, and gripping members pivotally secured to said arms so as to turn around axes in substantially the longitudinal directions of said arms, means for guiding said gripping members towards and away from one another, and curved guide rails located outside the path of movement of said gripping members and adapted to guide the beet held by said gripping members during the swinging movement of said members towards said knife.

6. A beet harvester as claimed in claim 5, in which the parallel shafts to which the arms supporting the gripping members are secured, are interconnected by means of ropes and rope pulleys in such manner that the gripping members swing symmetrically towards and away from one another.

7. A beet harvester as claimed in claim 5, in which a rotatable arm serves as a stop for retaining the gripping members in separated position in which said gripping members may receive a beet, one end of said arm projecting in between the feeding means for the beets, so that when said end is struck by the top of a beet the arm is turned and releases the gripping members so that said members may be moved towards one another by a spring and grip the beet.

8. A beet harvester according to claim 1, in which two plow-like top-guides are provided immediately in front of the means for pulling the beets out of the soil, said top-guides serving to gather the tops and convey the same in between said pulling means, the lower ends of said top guides being suitably formed as sleighs which prevent said pulling means from touching the ground.

OTTO GOTTFRIED WELLTON.